(12) United States Patent
Matayoshi et al.

(10) Patent No.: US 9,553,414 B2
(45) Date of Patent: Jan. 24, 2017

(54) MOTOR POWER FEED WIRING STRUCTURE HAVING A VEHICLE BODY-SIDE POWER FEED WIRE ROTATABLY CONNECTED TO A MOTOR-SIDE POWER FEED WIRE

(71) Applicant: Nissan Motor Co., Ltd., Yokohama-shi, Kanagawa (JP)

(72) Inventors: Yutaka Matayoshi, Kanagawa (JP); Tomoki Hirabayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/899,593

(22) PCT Filed: Apr. 25, 2014

(86) PCT No.: PCT/JP2014/061684
§ 371 (c)(1),
(2) Date: Dec. 18, 2015

(87) PCT Pub. No.: WO2015/001837
PCT Pub. Date: Jan. 8, 2015

(65) Prior Publication Data
US 2016/0149357 A1    May 26, 2016

(30) Foreign Application Priority Data
Jul. 4, 2013 (JP) ................................. 2013-140571

(51) Int. Cl.
*H01R 39/00* (2006.01)
*H01R 13/73* (2006.01)
(Continued)

(52) U.S. Cl.
CPC .............. *H01R 13/73* (2013.01); *H01R 39/64* (2013.01); *H02G 11/00* (2013.01); *B60K 7/0007* (2013.01);
(Continued)

(58) Field of Classification Search
CPC ....... H01R 35/025; H01R 35/04; H01R 39/00; H01R 39/34; H01R 39/64
USPC ......................................... 439/13, 15, 16, 34
See application file for complete search history.

(56) References Cited

U.S. PATENT DOCUMENTS

| 3,719,916 A * | 3/1973 | Worner | H01R 39/00 |
| | | | 188/181 R |
| 3,767,909 A * | 10/1973 | Bell | B60Q 1/326 |
| | | | 362/500 |

(Continued)

FOREIGN PATENT DOCUMENTS

| JP | H03-121930 A | 5/1991 |
| JP | 2002-247713 A | 8/2002 |
| JP | 2006-62388 A | 3/2006 |
| JP | 2008-308033 A | 12/2008 |
| JP | 2011-4526 A | 1/2011 |
| JP | 2013-159224 A | 8/2013 |

*Primary Examiner* — Chandrika Prasad
(74) *Attorney, Agent, or Firm* — Global IP Counselors, LLP

(57) ABSTRACT

A motor power feed wire routing structure for an in-wheel motor driven wheel includes an electrical connection that electrically connects a motor side feed wire extending from the motor and a vehicle body-side feed wire extending from a vehicle mounted power source such that the vehicle body-side feed wire is rotatably connected relative to the motor side feed wire. The electrical connection mechanism is disposed on the knuckle outside of a space of a wheel recess of the wheel. The configuration allows reduction of whirling of the vehicle body-side wire during steering operation.

20 Claims, 9 Drawing Sheets

(51) Int. Cl.
*H01R 39/64* (2006.01)
*H02G 11/00* (2006.01)
*H01R 35/04* (2006.01)
*B60K 7/00* (2006.01)

(52) U.S. Cl.
CPC ............... *B60K 2007/0038* (2013.01); *B60K 2007/0061* (2013.01); *B60L 2220/44* (2013.01); *B60L 2240/24* (2013.01); *B60L 2270/145* (2013.01); *H01R 35/04* (2013.01); *H01R 2201/26* (2013.01)

(56) References Cited

U.S. PATENT DOCUMENTS

| | | | | |
|---|---|---|---|---|
| 4,383,148 | A * | 5/1983 | Arima | B60K 37/00 200/61.54 |
| 8,851,901 | B2 * | 10/2014 | Hiroki | B60R 16/027 439/15 |
| 2003/0073333 | A1 * | 4/2003 | Matsumoto | H01R 39/64 439/164 |
| 2013/0095670 | A1 * | 4/2013 | Adachi | H01R 35/04 439/15 |
| 2013/0095671 | A1 * | 4/2013 | Arakawa | B60R 16/027 439/15 |
| 2013/0252442 | A1 * | 9/2013 | Hirai | H01R 35/04 439/16 |

* cited by examiner

MOTOR POWER FEED WIRING STRUCTURE HAVING A VEHICLE BODY-SIDE POWER FEED WIRE ROTATABLY CONNECTED TO A MOTOR-SIDE POWER FEED WIRE

CROSS-REFERENCE APPLICATION

This application is a U.S. National Stage Application of International Application No. PCT/JP2014/061684, filed Apr. 25, 2014, which claims priority to Japanese Patent Application No. 2013-140571 filed in Japan on Jul. 4, 2013.

BACKGROUND

Field of Invention

The present invention relates to a motor power feed line or wire routing structure for an in-wheel motor driven vehicle wheel that is driven by an electrical motor and steered by a steering operation.

Background Information

Conventionally, in an in-wheel motor for an electric vehicle for use in steered wheels disposed in the vehicle width or lateral direction inner side with respect to a kingpin axis, a structure is described in which a power feed wire and a rotation speed signal wire extend upwardly from a vehicle body-side end of the motor (see FIG. 2 of JP 2002-247713 A, for example).

SUMMARY

However, in the conventional in-wheel motor for an electric vehicle, there is a problem in that, when the steered wheel is turned, the power feed wire exiting the motor is subject to whirling or swinging greatly. Thus, the feed wire would interfere with the components arranged in a wheel house.

Further, in order to prevent the interference between the wire and the components, it is necessary to secure a large clearance with respect to the components in the wheel house (a sufficient space for wiring or routing). This would lead to a problem in that the wheel house is expanded.

The present invention has been made in view of the above problems, and aims to provide a motor power feed wire routing structure for an in-wheel motor driven wheel in which the whirling of the vehicle body-side feed wire may be reduced associated with the steering operation.

To achieve the above object, the present invention includes a knuckle disposed to be steered about a kingpin axis the upper side of which is inclined toward the vehicle width direction inner side with respect to a vehicle body, a wheel connected to an axle that is rotatably supported by the knuckle, and a motor for providing a driving force to the axle.

In the in-wheel motor driven wheel, an electrical connection mechanism electrically connects a motor side power feed wire extending from the motor and a vehicle body-side power feed wire extending from a vehicle mounted power source such that the vehicle body-side power feed wire is rotatably connected relative to the motor side power feed wire.

Moreover, the electrical connection mechanism is disposed on the knuckle outside of a space of a wheel recess of the wheel.

Thus, the electrical connection mechanism electrically connects the vehicle body-side feed power wire to the motor side power feed wire relatively rotatably to each other.

Further, the electrical connection mechanism is placed on the knuckle outside of a space of the wheel recess of the wheel.

That is, the knuckle is a member which is provided to be steered or turned about the kingpin axis representing a central axis of turning when steering the steered wheel. Thus, the electrical connection mechanism which is mounted on the knuckle will be disposed proximate to the kingpin axis. Therefore, the body-side power feed wire connected to the electric connection mechanism swings about the kingpin axis along a small radius of rotation even when the steered wheel is subject to great turn so that the whirling of the vehicle body-side power feed wire may be reduced associated with the steering.

BRIEF DESCRIPTION OF THE DRAWINGS

Referring now to the attached drawings which form a part of this original disclosure.

DETAILED DESCRIPTION OF THE EMBODIMENTS

Below, the best mode for implementing the motor power feed wire routing structure for an in-wheel motor driven wheel according to the present invention will be described on the basis of first to eight embodiments with reference to the accompanying drawings.

First Embodiment

Figure 1:
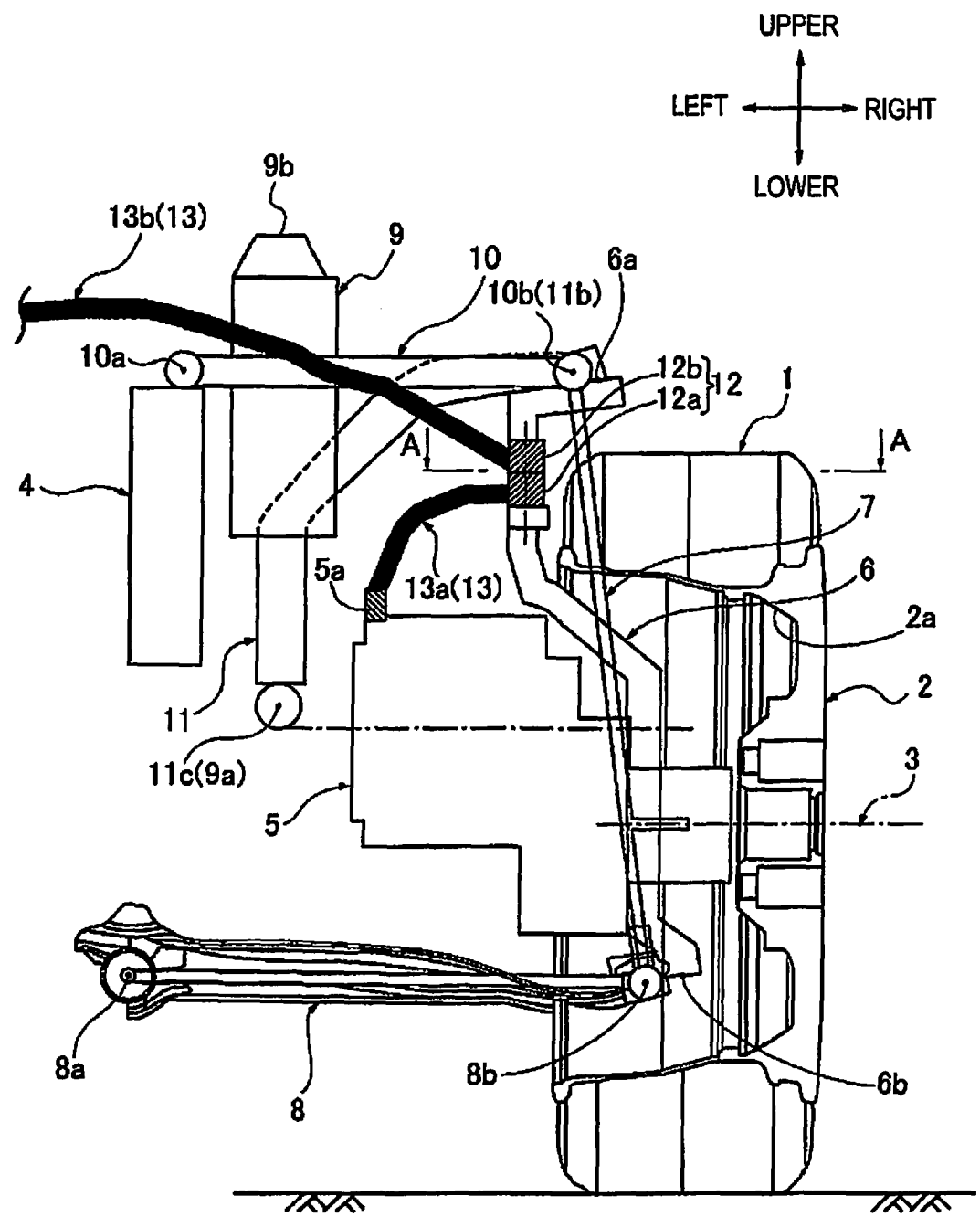
FIG. 1 is a front view of a mounting portion of the in-wheel motor driven wheel to which a motor power feed wire routing structure in a first embodiment is applied.

First, a description is given of the configuration. FIG. 1 shows a cross section of a mounting portion of the in-wheel motor driven wheel to which a motor power feed wire routing structure in a first embodiment is applied. Below, with reference to FIG. 1, a description is given of the overall structure of the in-wheel motor driven wheel.

The in-wheel motor driven wheel refers to a vehicle wheel disposed in a front wheel of an in-wheel motor vehicle, which is driven by a motor while being steered by the steering operation. The motor power feed wire routing structure refers to such a structure of the power feed wire which is subject to whirling or deflection in response to steering operation in the vicinity of the motor when a power feed line is connected from a vehicle mounted power source to the motor disposed or mounted within the wheel.

The in-wheel motor driven wheel of the first embodiment, as shown in FIG. 1, includes a tire 1, a wheel 2, a wheel axis 3, a vehicle body side member 4, an in-wheel motor 5 (motor), a knuckle 6, and a virtual kingpin axis 7. Further, as a front suspension member, a lower arm 8, a shock absorber shaft 9, an upper arm 10, and a third link 11 are provided. In addition, as a power feeding configuration to the in-wheel motor 5, a rotary power source terminal 12 (electrical connection mechanism), and an unsprung feed wire 13 are provided.

The tire 1 is incorporated in the wheel 2. Further, the knuckle 6 and the in-wheel motor 5 are integrated along the wheel axis 3 via a brake disk and a hub (not shown) to the wheel 2. The knuckle 6 is disposed so as to be steerable about the axis of virtual kingpin axis 7, the upper side of which is inclined in the vehicle width direction inner side with respect to a vehicle body, i,e., the upper side of the virtual kingdom axis 7 is inclined toward an inner side of the vehicle body with respect to a width direction of the vehicle as shown in FIG. 1. The wheel 2 is connected to an axle which is rotatably supported on the knuckle 6. The in-wheel motor 5 provides the driving force to the axle.

The lower arm 8 is arranged such that a body-side swivel point 8a of the lower arm is incorporated in the vehicle body while the other, motor side swivel point of the lower arm and kingpin axis bottom point 8b is incorporated rotatably to the knuckle lower end 6b. The upper end 6a of the knuckle 6 is rotatably incorporated into a third link 11. The shock absorber lower end 11c of the third link 11 is rotatably incorporated into the shock absorber lower end 9a, while the shock absorber upper end 9b is rotatably mounted to the vehicle body.

With respect to the upper arm 10, the body side shaft 10a thereof is rotatably incorporated to the vehicle body side member 4, while the other third link side shaft 10b thereof is swivel mounted to the third link 11.

The rotary power source terminal 12 is attached to the knuckle 6, and is composed of a fixed or stationary portion 12a and a rotating portion 12b. With respect to the stationary power feed wire 13a (motor side feed wire) constituting an unsprung feed wire, the movable power feed wire 13b (body side feed wire) is electrically connected to be relatively rotatable. Further, the rotary power source terminal 12 representing an electrical connection mechanism is disposed outside of a space of the wheel recess 2a of the wheel 2 and is mounted to the knuckle 6. Two ends of the stationary power feed wire 13a extending from the in-wheel motor 5 are connected to a fixed portion 12a which is disposed below in the vehicle vertical direction of the rotary power source terminal 12, and to the motor side power source terminal 5a of the in-wheel motor 5, respectively. The movable power feed wire 13b extending from the vehicle mounted power source (not shown) is connected to a rotating portion 12b disposed on the upper side in the vehicle vertical direction of the rotary power supply terminal 12.

The virtual 7 represents an axis that connects the lower end 6a of the knuckle 6, which corresponds to the motor side swivel point & lower point 8b of the kingpin axis, and the top end 6a of the knuckle 6, which corresponds to the knuckle arm side axis 11b of a third link. The tire 1 is turned about the virtual kingpin axis 7 by a tire steering mechanism (not shown). Note that, when the tire 1 is turned about the virtual kingpin axis 7, the wheel 2, the knuckle 7, the in-wheel motor 5, the rotary power source terminal 12, and the stationary power feed wire 12a are integrally turned in association. In addition, each component incorporated into the upper arm 10 and the lower arm 8 is subject to bound and rebound either about the body side axis 10a of the upper arm or the body side swivel axis 8a of the lower arm within a setting range of shock absorber shaft 9.

Figure 2:
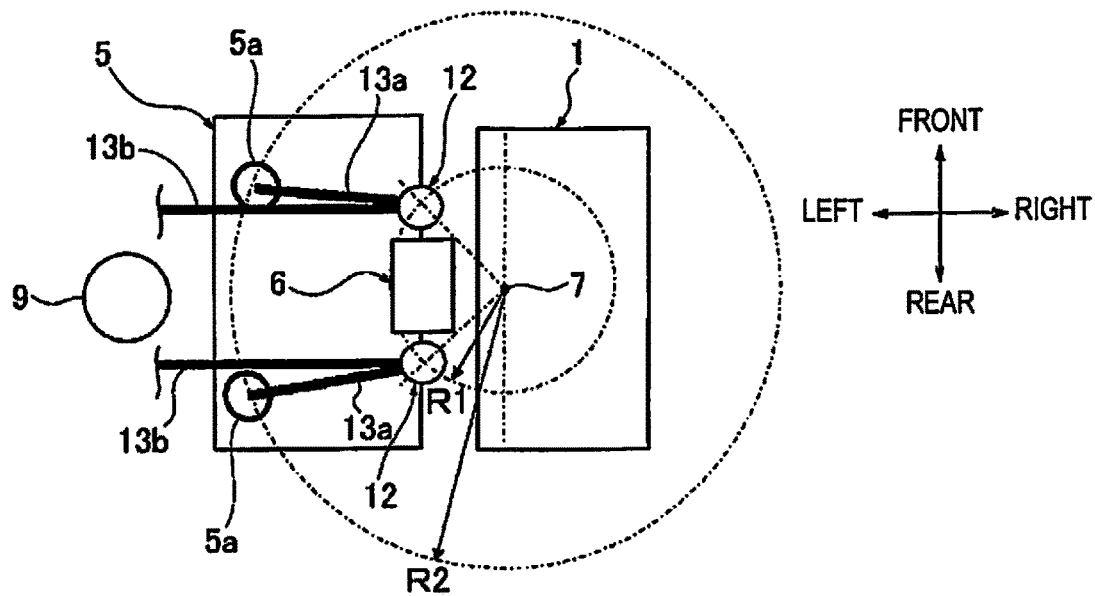
FIG. 2 is an A-A cross-sectional view (Part 1) of a rotary power source terminal mounting in the motor power feed wire routing structure in the first embodiment.

FIG. 2 is an A-A cross-sectional view (Part 1) of a rotary power source terminal mounting in the motor power feed wire routing structure in the first embodiment. Below, with reference to FIG. 2, a description is made of a rotary power supply or feed terminal mounting structure.

The knuckle 6 is placed close to the side of the tire 1. A stationary power feed wire 13a is connected to the rotary power source terminal 12 from the motor power source terminal 5a of the in-wheel motor 5. At the same time, a movable power feed wire 13b is connected from the rotary power source terminal 12 to the vehicle body side.

Each of two rotary power source terminals 12, as shown in FIG. 2, is disposed in a position in the vehicle longitudinal direction of the knuckle 6. That is, the knuckle 6 is configured such that the knuckle width W is set smaller than the motor diameter D when viewed in the axial direction of the motor (see FIG. 12), and the two rotary power terminals 12 and 12 are arranged around the knuckle 6 at substantially the same radius about the virtual kingpin axis 7 (rotation radius R1). Therefore, the rotation radius R1 connecting the two rotary power source terminals 12 and 12 with the virtual kingpin axis 7 representing the turning central axis is set smaller than the rotation radius R2 connecting the virtual kingpin axis 7 and the motor power source terminal 5a (i.e., R1<R2).

Figure 3:
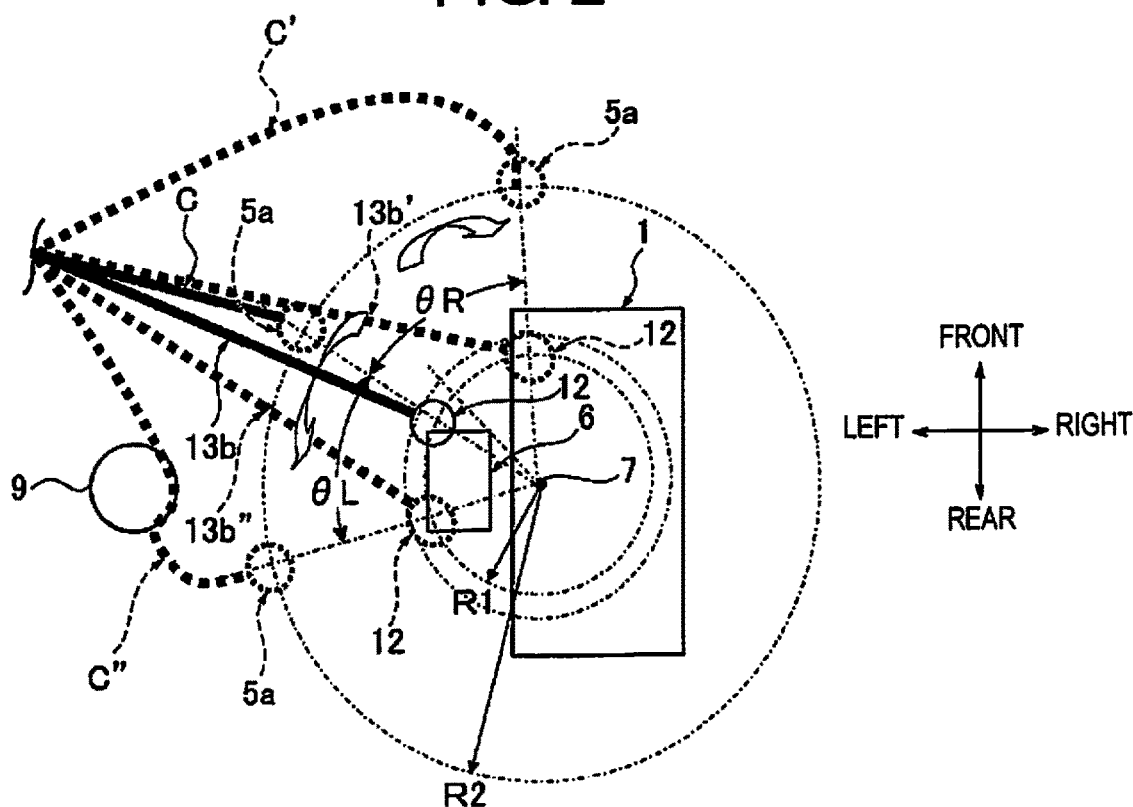
FIG. 3 is an explanatory view (Part 2) illustrating a motor wire and a rotary power source terminal wire during steering operation in a cross section corresponding to the rotary power source terminal mounting cross section A-A in the motor power feed wire routing structure in the first embodiment.

Now, a description is given of operation. FIG. 3 shows a motor wire and a rotary power source terminal wire in a cross section corresponding to the rotary power source terminal mounting cross section A-A in the motor power feed wire routing structure in the first embodiment. Below, with reference to FIG. 3, a description is given of the motor power feed wire routing operation for the in-wheel motor driven wheel in the first embodiment.

First, a motor power feed wire routing structure is assumed as a Comparative Example in which the unsprung feed wire from the onboard power source is connected directly to the motor power source terminal of the in-wheel motor.

In this Comparative Example, when a wheel turns with the right steering angle θR, the unsprung feed wire is deflected or whirled greatly along the rotation radius R2 with the motor power source terminal from a position of the unsprung feed wire C representative of a steering neutral position to a position of the unsprung feed wire C'. Further, when a wheel turns with the left steering angle θL, the unsprung feed wire is deflected or whirled greatly along the rotation radius R2 with the motor power source terminal from a position of the unsprung feed wire C representative of a neutral steering position to a position of the unsprung feed wire C". At this time, by being constrained to a minimum bend radius of the unsprung feed wire and by the power source terminal fixed on the vehicle body side, as shown in FIG. 3, the wire bulges in a large arcuate shape toward the vehicle front side. Also, the unsprung feed wire C" in response to the left steering operation, as shown in FIG. 3, is subject to deformed bending in contact interfere with the shock absorber shaft 9.

In contrast, in the first embodiment, the rotary power source terminal 12 electrically connects the stationary power feed wire 13a extending from the in-wheel motor 5 and the movable power feed wire 13b extending from the vehicle mounted power source such that the movable power feed wire 13b is rotatable relative to the stationary power feed wire 13a. Further, such a configuration is adopted in which the rotary power source terminal 12 is arranged or mounted on the knuckle 6.

That is, although the rotary power source terminal 12 arranged on the knuckle 6 is rotated in response to the right steering angle θR and the left steering angle θL, the rotary power source terminal 12 is closer to the virtual kingpin axis 7 than the motor power source terminal 5a. For this reason, the rotation radius R1 of the rotary power source terminal 12 is smaller than that of the rotation radius R2 of the motor power source terminal. Therefore, at the time of the right steering, the wire can be suppressed to a small whirling to the position of the moveable feed line 13b' from the movable power feeding line 13b of the steering neutral position along the rotation radius R1 along with the rotary power source terminal 12. Also, when steering to the left, the wire can be suppressed to a small whirling to the position of the moveable feed line 13b" from the movable power feed line 13b along the rotation radius R1 with the rotary power source terminals 12.

As a result, when steering the tire 1, it is possible to reduce the deflection or whirling of the movable power feed wire 13b associated with the steering operation.

Moreover, when connecting the unsprung feed wire 13 of the in-wheel motor 5 from the vehicle body via the rotary power source terminal 12, first, the rotary power source terminal 12 is attached to the knuckle 6 at the outside position of the wheel 2. Then, the fixing portion 12a of the rotary power source terminal 12 and the motor power source terminal 5a is connected by a stationary power feed wire 13a. Finally, the movable power feed wire 13b from the vehicle mounted power source is connected to the rotating portion 12b of the rotary power source terminal 12. Thus, the unsprung feed wire routing is performed by the connection between the rotating portion 12b of the rotary power source terminal 12 attached to the knuckle 6 and the movable power feed wire 13b, which realized a compact arrangement in a space away from the in-wheel motor 5.

In the first embodiment, when arranging the rotary power source terminal 12 to the knuckle 6, use is made of the structure of arranging the same in the space outside the wheel recesses 2a of the wheel 2.

For example, when placing the rotary power source terminal to the knuckle, it is also possible to arrange the knuckle upward of the knuckle in the extending direction of the kingpin axis. However, in the case of arranging the rotary power source terminal to the knuckle upward, it is necessary to avoid interference with the rotary power source terminal. This would amount to increase in the height of the wheel house. For this reason, the vehicle height or hood height would rise, which would make a vehicle less attractive.

It is also conceivable to arrange the same in the space of the wheel recess at the motor top. However, when the rotational power source terminal is disposed in the wheel, it is necessary to secure an installation space of the rotary power source terminals in the wheel. Thus, in this case, there is no other choice but to increase the wheel diameter, which would make the wheel size large. For this reason, as in the case where the above-mentioned rotary power source terminal is disposed above the knuckle, the height of the wheel house becomes high, which would result in larger vehicle height or hood height. Thus, appearance of the vehicle is less attractive.

In contrast, by arranging the rotary power source terminal 12 on the knuckle 6 outside of the space formed by the wheel recess 2a of the wheel 2, the height of the wheel house can be set lower. Thus, without increasing the vehicle height or hood height, the design flexibility is improved so that appeal as a vehicle increases.

In the first embodiment, the knuckle width of the knuckle 6 is set smaller than the motor diameter when viewed in the axial direction of the motor. Also, such a configuration is adopted in which the fixing portion 12a or the rotary power source terminal 12 is arranged on the lower side of the vehicle vertical direction and the rotating portion 12b of the rotary power source terminal 12 is disposed on the upper side of the vehicle vertical direction.

Thus, by setting the knuckle width of the knuckle 6 smaller than the motor diameter when viewed in the axial direction of the motor, it is possible to place the rotary power source terminal 12 close to the virtual kingpin axis 7. Further, when the rotary power source terminal 12 is rotated associated with the steering to the left or right direction, the rotating portion 12b is rotated by a pulling force from the movable power feed line 13b, and the connection point with respect to the rotating portion 12b of the movable power feed wire 13b is directed to the shortest. That is, the movable power feed wires 13b, 13b 13b" at each of the steering positions, as shown in FIG. 3, show a straight line shape feed wire connecting the rotating portion 12b and the vehicle mounted power supply.

Therefore, when compared to the case of the knuckle width motor being set greater than the motor diameter, the rotary power source terminal 12 may be brought closer to the virtual kingpin axis 7. Further, by allowing the free overall length of the movable power feed wire 13b to be shortened, it is possible to hold the whirling movement or deflection of the movable power feed wire 13b small. In addition, since the whirling space is reduced, the design flexibility of the peripheral part is increased. At the same time, due to the movement of the rotating portion 12b of the rotary power source terminal 12 with a rotational displacement degree of freedom, it is possible to reduce shaking, twisting, and deformation of the movable power feed wire 13b itself.

Furthermore, since it is possible to utilize the surrounding space of the knuckle 6, which originally serves as dead space, without providing an extra space for arranging the rotary power source terminal 12 to thereby prevent the movable power feed wire 13b from whirling.

In the first embodiment, the rotary power source terminal 12 has two pieces or units. The two units of rotary power terminal 12 is configured to be arranged around the knuckle 6 so as to be located at substantially the same radius (=rotation radius R1) about the virtual kingpin axis 7.

For example, in the case of a two-phase-wheel motor 5, the two rotating power terminal units 12, 12 are connected to respective movable power feed wires 13b, 13b. At this time, the two movable power feed wires 13b, 13b will be jointly suppressed from whirling without imparting a difference in the whirling reduction caused by the steering operation.

Now, a description is given of the effect. In the motor power feed wire routing structure in the in-wheel motor driven wheel in the first embodiment, it is possible to obtain the following effects.

(1) An in-wheel motor driven wheel having a knuckle 6 to be steered about a virtual kingpin axis 7 the upper side of which is inclined in the vehicle width direction inner side with respect a vehicle body, a wheel connected to an axle that is rotatably supported by the knuckle 6, and a motor (in-wheel motor 5) for providing a driving force to the axle, the in-wheel motor driven wheel comprising:

an electrical connection mechanism (rotary power source terminal 12) that electrically connects a motor side power feed wire (stationary power feed wire 13a) extending from the motor (in-wheel motor 5) and a vehicle body-side power feed wire (movable power feed wire 13b) extending from a vehicle mounted power source such that the vehicle body-side power feed wire (movable power feed wire 13b) is rotatably connected relative to the motor side power feed wire (stationary power feed wire 13a), wherein the electrical connection mechanism (rotary power source terminal 12) is disposed on the knuckle 6 outside of a space of a wheel recess 2a of the wheel 2 (FIG. 1).

Thus, it is possible to reduce whirling of the vehicle body-side power feed wire (movable power feed wire 13b) associated with a steering operation. Further, since the electrical connection mechanism (rotary power source terminal 12) is arranged on the knuckle 6 outside of the space of the wheel recess 2a of the wheel 2, it is possible to suppress the height of the wheel house.

(2) The knuckle 6 is configured such that the knuckle width is set smaller than the motor diameter when viewed in the axial direction of the motor. Further, with respect to the electrical connection mechanism (rotary power source terminal 12), a fixing portion 12a to which the motor side feed wire (stationary power feed wire 13a) is connected and a rotating portion 12b to which the vehicle body-side power feed wire (movable power feed wire 13b) is connected, are provided, wherein the fixing portion 12a is arranged on the lower side of the vehicle vertical direction while the rotating portion 12b is arranged on the upper side of the vehicle vertical direction (FIG. 1).

Therefore, in addition to the effect of (1), it is possible to place the electrical connection mechanism (rotary power source terminal 12) closer to the virtual kingpin axis 7. Also, by shortening the free overall length of the vehicle body-side feed wire (movable power feed wire 13b), it is possible to suppress vehicle body side feed wire (movable power feed wire 13b) from whirling.

(3) The electrical connection mechanism (rotary power source terminal 12) is composed of a plurality of pieces or units. Further, the plurality of the units of the electrical connection mechanism (rotary power source terminal 12) are arranged around the knuckle 6 such so as to be located at substantially the same radius about the virtual kingpin axis 7 (rotation radius R1).

As is appreciated, in addition to the effects of (1) and (2), without causing a difference in whiling reduction effect associated with steering among the plurality of vehicle body-side power feed wires (movable power feed wire 13b), it is possible to reduce the overall whirling.

Second Embodiment

In a second embodiment, two rotary power source terminal units, i.e., a first rotary power source terminal unit 12(1) and a second rotary power source terminal unit 12(2), are respectively arranged around the knuckle 6 at a rotation radius R1 and a rotation radius R3 (>R1) about the virtual kingpin axis 7, respectively.

Figure 4:
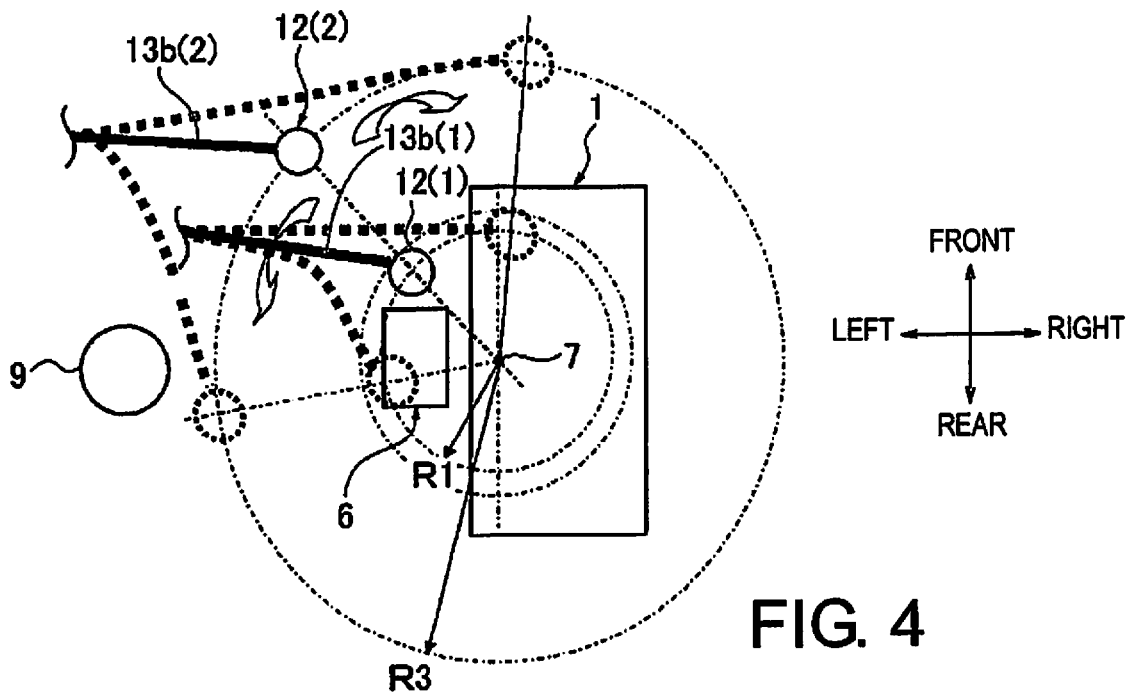
FIG. 4 is an explanatory view (Part 3) showing differences in the position of the rotary power source terminal during steering operation in a cross section corresponding to the rotary power source terminal mounting cross section A-A in the motor power feed wire routing structure in a second embodiment.

FIG. 4 shows the difference in the position of the rotary power source terminal in a cross section corresponding to the rotary power source terminal mounting section A-A in the second embodiment. Below, with reference to FIG. 4, a description is given of the second embodiment.

In the second embodiment, the first rotary power source terminal unit 12(1) out of the two rotary power source terminal units 12 (1), 12 (2) is arranged around the knuckle 6 at the rotation radius R1 about the virtual kingpin axis 7. Further, the second rotary power source terminal unit 12 (2) is placed in a radial extension line connecting the virtual kingpin axis 7 and the first rotary power source terminal 12 (1), at the position of the rotation radius R3 (>R1). Note that the two rotary power terminal units 12 (1), 12 (2) are both disposed on the vehicle front side of the wheel axis 3.

FIG. 4 shows the variations or deflected states of the movable power feed power wires 13b(1), 13b(2) when the rotary power terminal units 12(1), 12(2) with different rotation radii R1, R3 about the virtual kingpin axis 7 are subject to be moved at the same steering angle. The arrangements of the first rotary power source terminal unit 12(1) and the second rotary power source terminal unit 12(2) in this manner results in a configuration in which the first rotary power source terminal unit 12(1) is mounted on the knuckle close to the virtual kingpin axis 7 while the second rotary power source terminal unit 12(2) is arranged closer to the vehicle mounted power source. By arranging the first rotary power source terminal unit 12(1) close to the virtual kingpin axis 7, the first movable power feed wire 13b(1) undergoes a change indicated in broken line in FIG. 4. Thus, whirling will be suppressed. In addition, by arranging the second movable power feed wire 13b(2) closer to the vehicle mounted power source, it is possible to shorten the length of the second movable power feed wire 13b(2) compared to the first embodiment.

Note that, since the other configurations and effects are the same as in the first embodiment, description thereof will be omitted.

In the motor power feed wire routing structure in the in-wheel motor driven wheel in the second embodiment, it is possible to obtain the effect (1) and (2) described in the first embodiment.

Third Embodiment

In a third embodiment, an example is shown in which three rotary power terminal units 12(1), 12(2), 12(3) are arranged around at substantially the same rotation radius R1 that is centered on the virtual kingpin axis 7.

Figure 5:
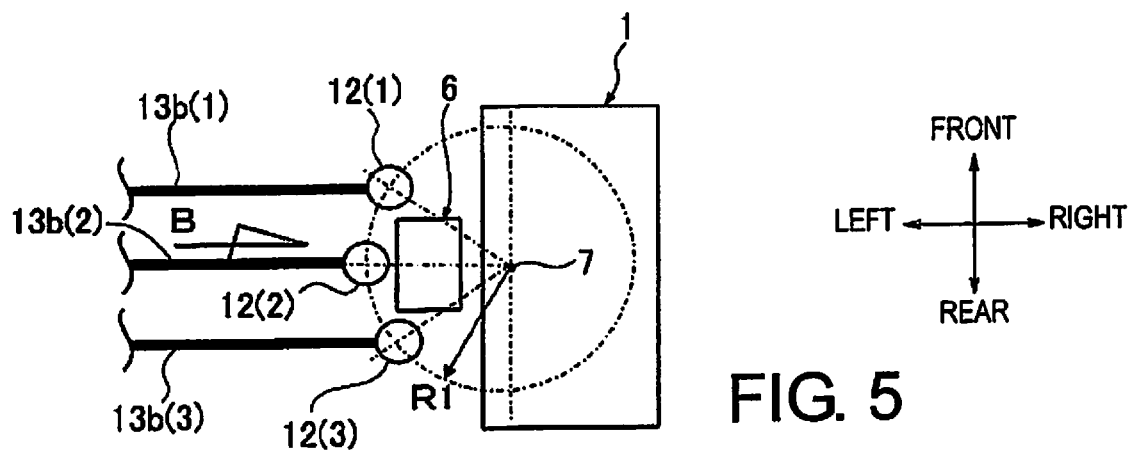
FIG. 5 is an explanatory view (Part 4) showing a plurality of rotary power source terminal units during steering operation in a cross section corresponding to the rotary power source terminal mounting cross section A-A in the motor power feed wire routing structure in a third embodiment.
Figure 6:
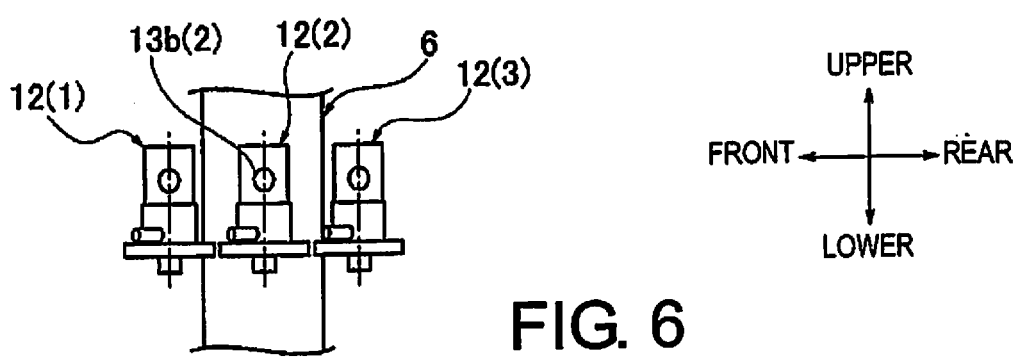
FIG. 6 is a diagram (Part 1) illustrating a plurality of rotary power terminal mountings viewed in a direction of arrow B in the motor power feed wire routing structure of the third embodiment.

FIG. 5 shows a plurality of rotary power source terminal units during steering operation in a third embodiment in a cross section corresponding to the rotary power source terminal mounting cross section A-A in the motor power feed wire routing structure. FIG. 6 is a diagram (Part 1) showing the plurality of rotary power terminal units mounting viewed in a direction of arrow B. Below, with reference to FIGS. 5, 6, a description is given of the third embodiment.

In the third embodiment, the three rotary power terminal units 12 (1), 12 (2), and 12 (3) are all arranged around the knuckle 6 in a equidistant position of the rotation radius R1 around the virtual kingpin axis 7. At this time, the three movable power feed wires 13b (1), 13b (2), and 13b (3) are respectively connected in a knuckle front position, a knuckle position, and knuckle rearward position, as shown in FIG. 5, with equal intervals in the vehicle longitudinal direction. Further, the three rotary power terminal units 12 (1), 12 (2), and 12 (3), are placed, as shown in FIG. 6, at the same height position in the vehicle vertical direction with respect to the knuckle 6.

Thus, in the third embodiment, the arrangement is well suited to power a 3-phase, in-wheel motor 5. Further, by arranging the three rotary power source terminal units 12(1), 12(2), and 12(3) close to the virtual kingpin axis 7 (at rotation radius R1), the whirling of the three movable power feed wires 13b(1), 13b(2) and 13b (3) can be suppressed.

Note that the other configurations and effects are the same as in the first embodiment. Thus, the description thereof will be omitted.

In the motor power feed wire routing structure for the in-wheel motor driven wheel in the third embodiment, it is possible to obtain the effects (1) to (3) of the first embodiment.

Fourth Embodiment

In a fourth embodiment, an example is illustrated in which three rotary power source terminal units 12(1), 12(2), and 12(3) disposed around the knuckle 6 are arranged at different height positions.

Figure 8:
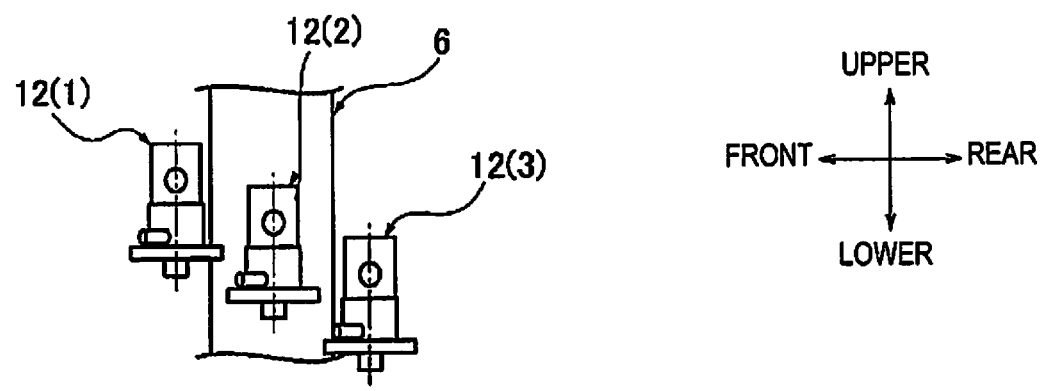
FIG. 8 is a diagram (Part 3) illustrating a plurality of rotary power terminal mountings in a direction of arrow B in the motor power feed wire routing structure of the fourth embodiment.
Figure 9:
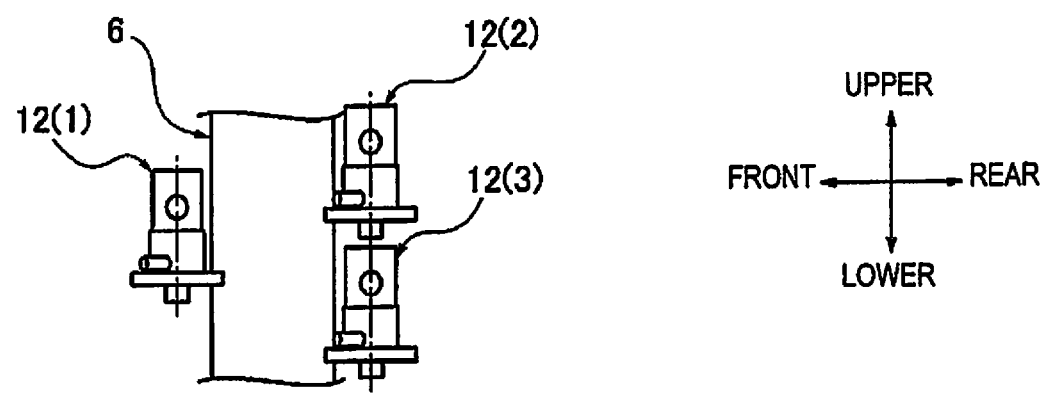
FIG. 9 is a diagram (Part 4) illustrating a plurality of rotary power terminal mountings in a direction of arrow B in the motor power feed wire routing structure of the fourth embodiment.

7 shows a plurality rotational power terminals mounted arrow B in the motor power feed line routing structure of Example 4 (Part 2), FIG. 8 shows a multiple rotary power terminals mounted arrow B (3), FIG. 9 shows a plurality rotation power terminal mounting arrow B (Part 4). Hereinafter, a fourth embodiment will be described with reference to FIGS.

Figure 7:
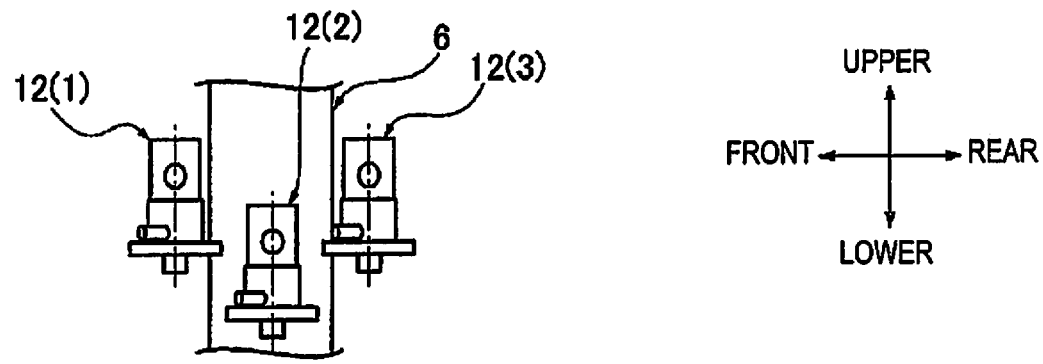
FIG. 7 is a diagram (Part 2) illustrating a plurality of rotary power terminal mountings viewed in a direction of arrow B in the motor power feed wire routing structure of a fourth embodiment.

FIG. 7 shows an example in which, of the three rotary power source terminal units 12(1), 12(2), and 12(3), the first rotary power source terminal unit 12(1) and the third rotary power source terminal unit 12(3) are arranged at the same height, while the second rotary power source terminal unit 12(2) is arranged to be shifted in the vehicle lower position. FIG. 8 shows an example in which, of the three rotary power source terminal units 12(1), 12(2), and 12(3), the first rotary power source terminal unit 12(1) is arranged at the highest position, the second rotary power source terminal unit 12(2) is arranged in the next height position, and the third rotary power source terminal unit 12(3) is arranged in the lowest position. FIG. 9 shows an example in which, out of the three rotary power source terminal units 12(1), 12(2), and 12(3), the first rotary power source terminal unit 12(1) is disposed on the vehicle front side, and the second rotary power source terminal unit 12(2) and the third rotary power source terminal unit 12(3) are arranged side by side to the vehicle rear side.

When arranging three rotary power source terminal units 12 (1), 12 (2), 12 (3) around the knuckle 6 close to the virtual kingpin axis 7 at the same height position, a situation may occur in which the feed wire interval between adjacent movable power feed wires 13b(1), 13b(2), and 13b(3) is not sufficient. In contrast, in the fourth embodiment, among the three rotary power source terminal units 12 (1), 12 (2), and 12(3), the central one may be shifted in the vertical direction (FIG. 7), the three units may be vertically shifted from each other (FIG. 8), or one unit is shifted from the remaining two units (FIG. 9). Thus, the arrangement of three rotary power source terminal units 12(1), 12(2), and 12(3) with respect to the knuckle 6 is configured to provide a step either vertically or horizontally. Therefore, in response to a steering operation, even when a plurality of movable power feed wires 13b(1), 13b(2), and 13b(3), such as three-phase wires, are subject to be deflected, the interval between adjacent feed wires is sufficiently secured to thereby prevent the interference among the movable power feed wires 13b(1), 12b(2), and 13b(3).

Note that the other configurations and effects are the same as in the first embodiment. Thus, the description thereof will be omitted.

Now, a description is given of the effect. In the motor power feed wire routing structure of the in-wheel motor driven wheel in the fourth embodiment, in addition to the effects of (1) to (3) in the first embodiment, it is possible to obtain the following effect.

(4) When arranging a plurality of units constituting the electrical connection mechanism (rotary power source terminal 12) close to the virtual kingpin axis 7 around the knuckle 6, the units are configured to be arranged with a step in different height positions in the vehicle vertical direction (FIGS. 7, 8, and 9).

Therefore, even when a plurality of units constituting the electrical connection mechanism (rotary power source terminal units 12 (1), 12 (2), 12 (3)) are arranged close to the virtual kingpin axis 7 around the knuckle 6, it is possible to prevent interference among the plurality of the vehicle side power feed wires (movable power feed wires 13b (1), 13b (2), 13b (3)).

Fifth Embodiment

In a firth embodiment, an example is shown in which, with respect to one rotary power source terminal, a plurality of feed wires are connected so as to form a multiple wire integral rotary power source terminal.

Figure 10:
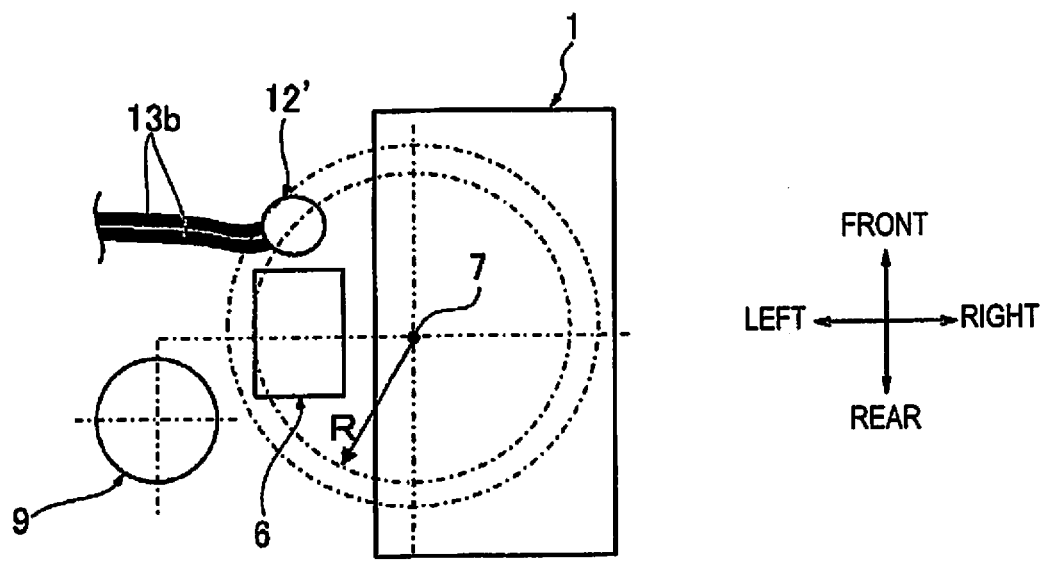
FIG. 10 is an arrangement explanatory view (Part 5) showing a position of an integral rotary power source terminal for a plurality of wires in a cross section corresponding to the rotary power source terminal mounting cross section A-A in the motor power feed wire routing structure in a fifth embodiment.
Figure 11:
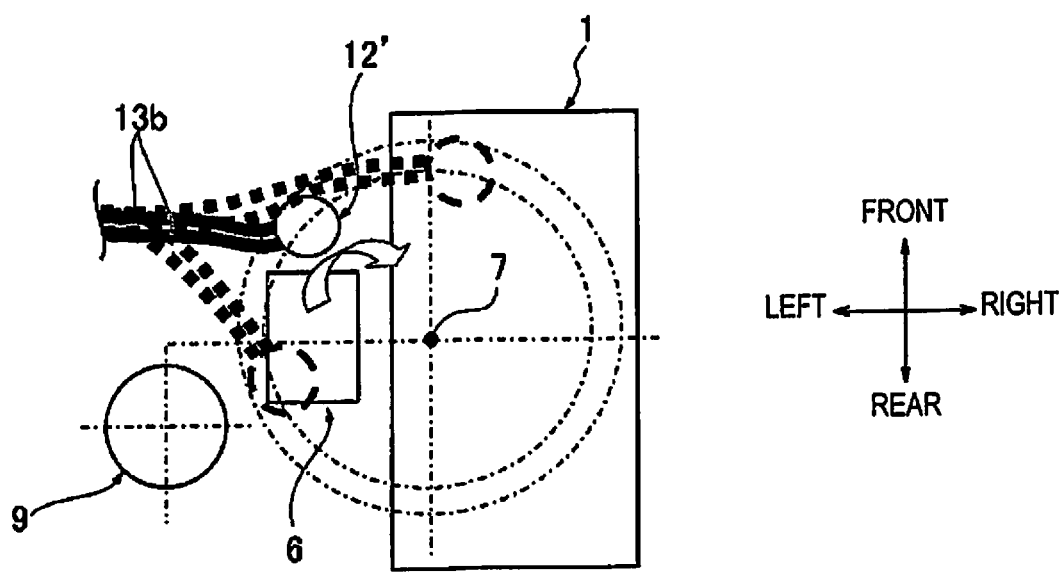
FIG. 11 is a turning trajectory explanatory view (Part 6) showing the steering trajectory of the integral rotary power source terminal of a plurality of wires in a cross section corresponding to the rotary power source terminal mounting cross section A-A in the firth embodiment.

FIG. 10 shows an integral rotary power source terminal for a plurality of wires in the fifth embodiment in a cross section corresponding to the rotary power source terminal mounting cross section A-A for the motor power feed wire routing structure. FIG. 11 is a turning trajectory explanatory view (Part 6) showing the steering trajectory of the integral rotary power source terminal. Below, with reference to FIGS. 10, and 11, a description is given of the fifth embodiment.

The multiple wire integral rotary power source terminal 12' is formed in a multi-pole rotary power source terminal structure, in which a rotary power source terminal for connecting a plurality of feed wires, such as two or three, is formed in one piece. In the fifth embodiment, as shown in FIG. 10, the multiple wire integral rotary power source terminal 12' is disposed at the position of rotation radius R from the virtual kingpin axis 7 at a rotation radius R, only on the vehicle front side of the knuckle 6.

For example, such as when a shock absorber shaft 9 is placed to be offset in one side of the knuckle 6 with respect to the virtual kingpin axis 7, sometimes the rotary power source terminal may not be arranged on the one side of the knuckle 6. In contrast, with the use of multiple wire integral rotary power source terminal 12', it can be placed in the empty space on the other side of the knuckle 6. Further, since a plurality of stationary power feed wires 13a and the movable power feed wire 13b are configured to be connected to the one rotary power source terminal, the multiple wire integral rotary power source terminal 12' may be placed in bundle, as shown in FIG. 11, to reduce interference space. For example, when bundling two movable power source wires 13b, the interference space may be halved. When bundling three movable power source wires 13b, the interference space may be reduced to one third.

Note that the other configurations and effects are the same as in the first embodiment. Thus, the description thereof will be omitted.

Now, a description is made of the effect. In the motor power feed line routing structure of the in-wheel motor drive wheels of Example 5, in addition to the effect of Example 1 (1) to (3), it is possible to obtain the following effect.

(5) The electrical connection mechanism (rotary power source terminal 12) is formed in a multi-pole rotary power source terminal structure so that a single multiple wire integral rotary power source terminal 12' is configured to connect a plurality of feed wires (stationary power feed wire 13a, movable power feed wire 13b) by a single piece multiple-wire integral rotary power source terminal 12' (FIG. 10).

Therefore, even when additional member is to be disposed near the knuckle 6, it is possible to secure the degree of freedom in the arrangement of the rotary power source terminal 12 to a position close to the virtual kingpin axis 7 around the knuckle 6. Also, it is possible to reduce interference space due to a plurality of movable power feed wires 13b.

Sixth Embodiment

In a sixth embodiment, in place of the bracket for fixing a stationary power feed wire and a rotary power source terminal, an example is shown using a stationary power feed wire integral bracket forming these integrally.

Figure 12:
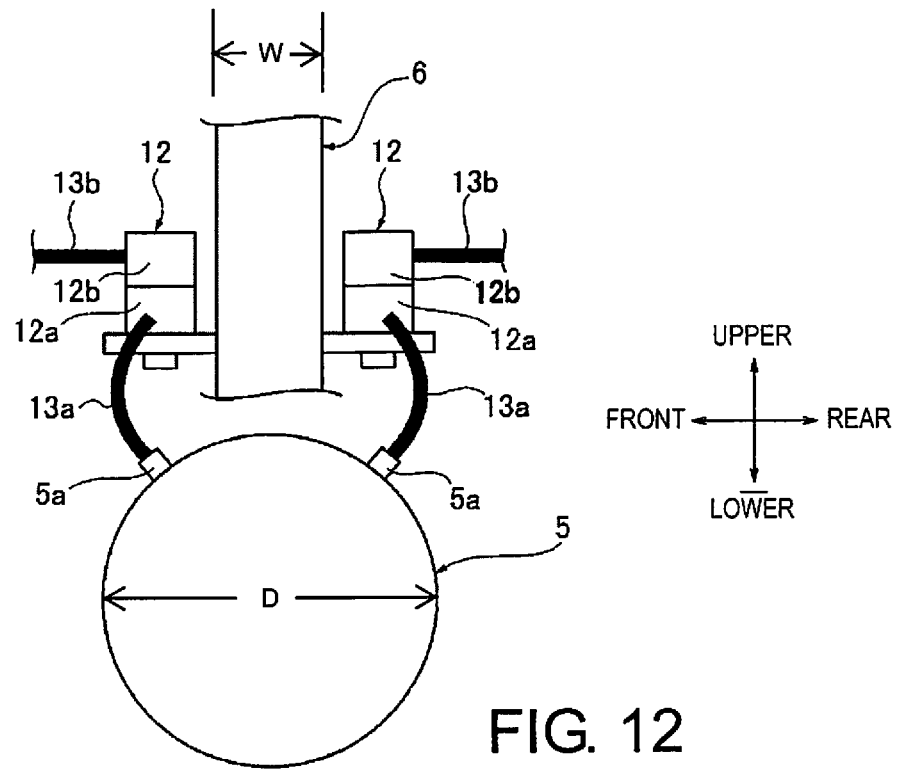
FIG. 12 is a wiring diagram illustrating a stationary power feed wire when viewed from rearward end of the rotary power source terminal mounted motor in the motor power feed wire routing structure in the first embodiment.
Figure 13:
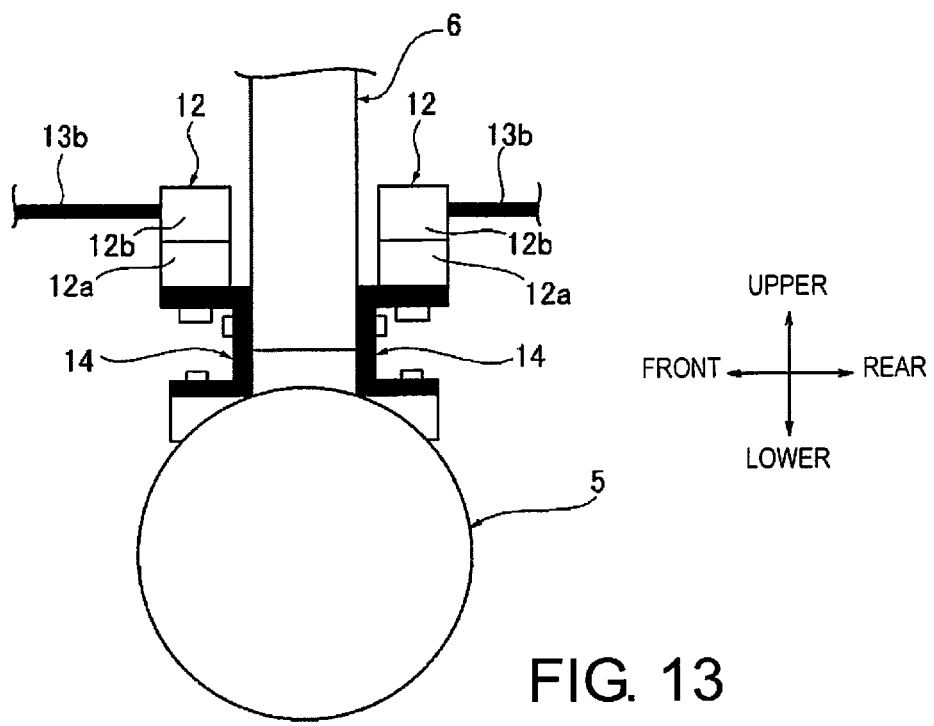
FIG. 13 is a routing diagram illustrating an arrangement structure of a stationary power feed wire integral bracket as viewed rearward end from the rotary power source terminal mounted motor in the motor power feed wire routing structure in the sixth embodiment.
Figure 14:
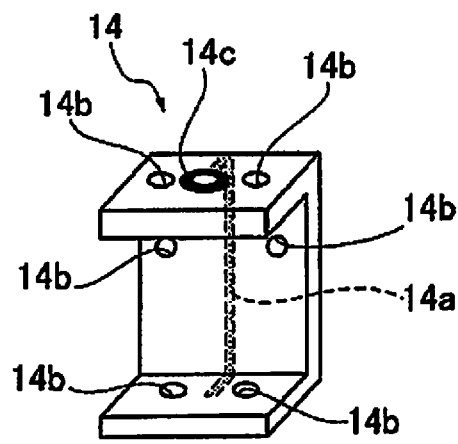
FIG. 14 is a perspective view showing a reinforcing bracket structure that integrally forms the stationary power feed wire of the sixth embodiment.
Figure 15:
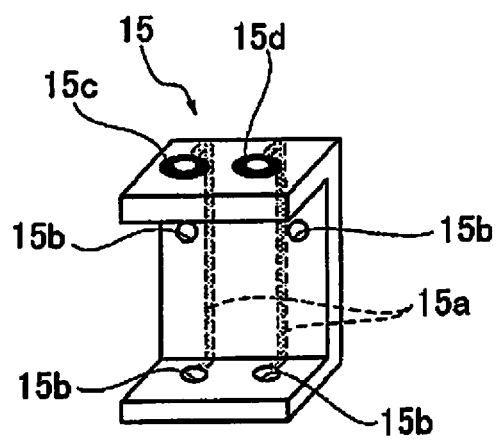
FIG. 15 is a perspective view showing a reinforcing bracket that integrally forms a plurality of the stationary power feed wires of the sixth embodiment.

FIG. 12 shows the stationary power feed wire when viewed from rearward end of the rotary power source terminal mounted motor in the motor power feed wire routing structure. FIG. 13 shows a stationary power feed wire integral bracket as viewed rearward end from the rotary power source terminal mounted motor in the motor power feed wire routing structure. FIG. 14 shows a reinforcing bracket structure integral with a stationary power feed wire. FIG. 15 shows a reinforcing bracket structure integral with a plurality of stationary power feed wires. Below, with reference to FIGS. 12 to 15, a description is given of the sixth embodiment.

First, in the case of the first embodiment, as shown in FIG. 12, the motor power source terminal 5a of the in-wheel motor 5 is connected by a stationary power feed wire 13a to a fixed portion 12b of the rotary power source terminal 12 which is disposed near the knuckle 6. On the other hand, to the rotating portion 12a of the rotary power supply terminal 12, a movable power feed wire 13b leading to the vehicle body is connected. The rotary power supply terminal 12 is fixed via a bracket to the knuckle 6. In other words, the stationary power feed wire 13a and the bracket for fixing the rotary power source terminal 12 are separate.

In contrast, in the sixth embodiment, as shown in FIG. 13, by using a stationary power feed wire integral bracket 14 formed of a reinforcing bracket structure integral with the stationary power feed wire, the in-wheel motor 5, the rotary power source terminal 12, and the knuckle 6 are fixed in position. The stationary power feed wire integral bracket 14 has, as shown in FIG. 14, a terminal surface 14c to be electrically conductive with the in-wheel motor 5 and the stationary power source terminal 12. Further, the conductive wire 14a is housed in a non-electric material such as reinforced rubber or reinforced plastic. The bracket is fixed with a bolt fixing hole 14b.

Note that the stationary power feed wire integral bracket may be formed in a stationary power feed wire integral bracket 15 of a reinforcing bracket structure integral with a plurality of stationary power feed wires. This stationary power feed wire integral bracket 15 has, as shown in FIG. 15, terminal surfaces electrically conductive with the in-wheel motor 5 or the rotary power source terminal 12. A plurality of conductive wires 15a is encased in a non-conductive material such as reinforced rubber or reinforced plastic. The braked 15 is further fixed through a bolt fixing hole 15b.

Thus, in the stationary power feed wire integral brackets 14, 15 in the sixth embodiment, the stationary power feed wire is formed in a conductive reinforcing bracket structure. Further, the in-wheel motor 5, the rotary power source terminal 12, and the knuckle 6 are fixed in position. Thus, it is possible to reinforce the support strength of the in-wheel motor 5. In particular, as shown in FIG. 13, when fixing a pair of stationary power feed wire integral brackets 14, 14 are fixed, the in-wheel motor is supported in a both end support condition. Thus, it is possible to further reinforce the support strength of the in-wheel motor 5. Also, it is possible to achieve even compactness by forming the stationary power feed wire integral with the bracket. Note that the other configurations and effects are the same as in the first embodiment. Thus, the description thereof will be omitted.

Now, a description is given of the effect. In the motor power feed wire routing structure for the in-wheel motor driven wheel in the sixth embodiment, in addition to the effects of (1) to (3) in the first embodiment, the effect of (4) in the fourth embodiment, and the effect of (5) in the fifth embodiment, it is possible to obtain the following effect.

(6) The stationary power feed wire is formed in a stationary power feed wire integral bracket 14, 15 of a conductive reinforcing bracket structure which is fixed to the motor (in-wheel motor 5), the electrical connection mechanism (rotary power source terminal 12) and the knuckle 6 (FIG. 13).

Therefore, it is possible to reinforce the support strength of the motor (in-wheel motor 5). Further, it is possible to achieve reduction and compactness of the components.

Furthermore, since the stationary power feed wire integral brackets 14 and 15 are configured with a spring constant of such as reinforced rubber or reinforced plastic, which is different from that of metal, it is possible to achieve vibration reduction of the motor itself to thereby suppress deformation of the motor case.

Seventh Embodiment

In a seventh embodiment, an example of efforts is shown to make the rotary power source terminal compact.

Figure 16:
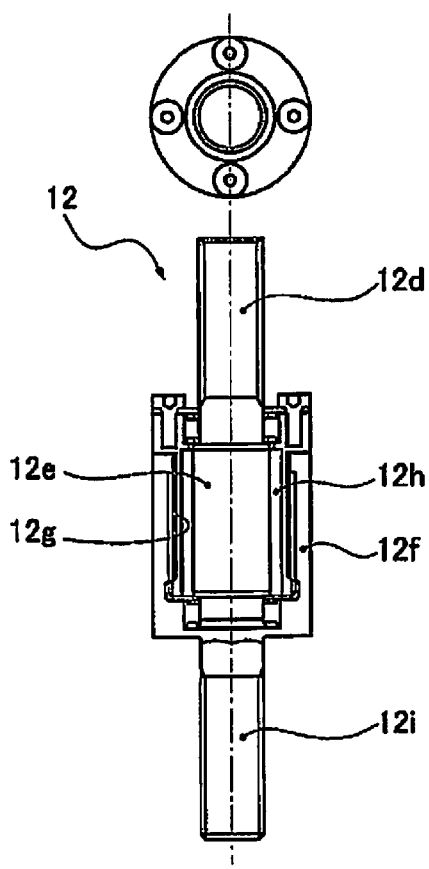
FIG. 16 is a sectional view of a compact structure of the rotary power terminals in the motor power feed wire routing structure in a seventh embodiment.

FIG. 16 shows a structure of a rotary power source terminal, which is made compact in the motor power feed line routing structure in a seventh embodiment. Below, a description is given of the seventh embodiment with reference to FIG. 16.

The rotary power source terminal 12, as shown in FIG. 16, includes a rotating contact portion 12e, a rotating screw portion 12d, a stationary fixed portion 12f, and fixed screw portion 12i. Further, a resilient member 12 is interposed in a gap between the fixed cylindrical contact surface 12g and a rotating contact surface 12e for press fitting the parts relatively rotatably.

Thus, the rotary power source terminal 12 is configured such that the resilient member 12h is interposed in a gap formed between the outer periphery of the rotating shaft member (rotating contact portion 12e and the rotating screw portion 12d) and the inner periphery of the cylindrical fixing member (fixing portion 12f and the fixing screw portion 12i). Therefore, while reducing the number of components and downsizing radially, it is possible to energize by a stable electricity while rotating the rotating contact portion 12e and the rotating screw portion 12d.

Note that the other configurations and effects are the same as in the first embodiment. Thus, the description thereof will be omitted.

Now, a description is given of the effect. In the motor power feed wire routing structure in the in-wheel motor driven wheel in the seventh embodiment, in addition to the effects of (1) to (3) in the first embodiment, the effect of (4) in the fourth embodiment, the effect of (5) in the fifth embodiment, and the effect of (6) in the sixth embodiment, it is possible to obtain the following effect.

(7) The electrical connection mechanism is formed in a rotary power source terminal 12 which is configured such that a resilient member 12 h is interposed in a gap formed between the outer periphery of a rotating shaft member (rotating contact portion 12e and rotating screw portion 12d) and the inner periphery of the cylindrical fixing member (fixing portion 12f and fixing screw portion 12i) (FIG. 16).

Accordingly, while reducing the number of components and downsizing in the radial direction, it is possible to energize with a stable electricity while rotating the rotating shaft member (rotating contact portion 12e and rotating screw portion 12d).

Eighth Embodiment

In an eighth embodiment, an example is shown in which leakage measures against the surrounding in a compacted rotary power source terminal.

Figure 17:
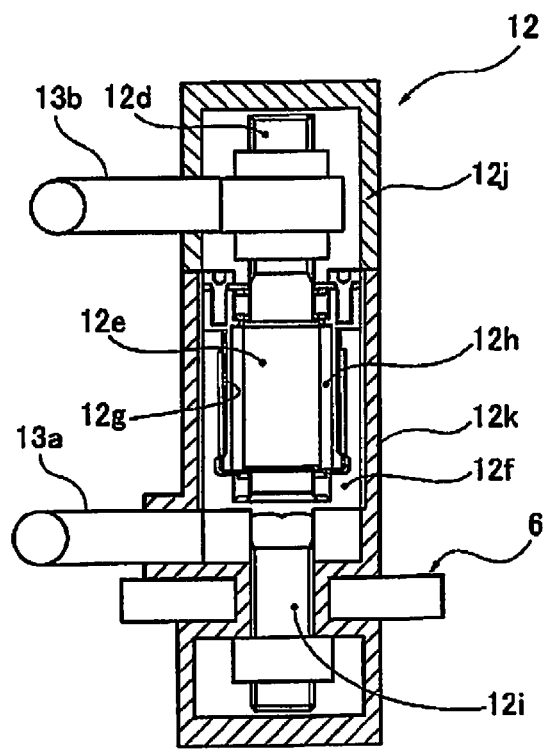
FIG. 17 is a sectional view illustrating a structure considering the leakage measures against the periphery of the rotary power source terminal which is made compact in the motor power feed wire routing structure of an eighth embodiment.

FIG. 17 shows a structure considering the leakage measures against the surroundings of the rotary power source terminal which is made compact in the motor power feed wire routing structure of an eighth embodiment.

Figure 18:
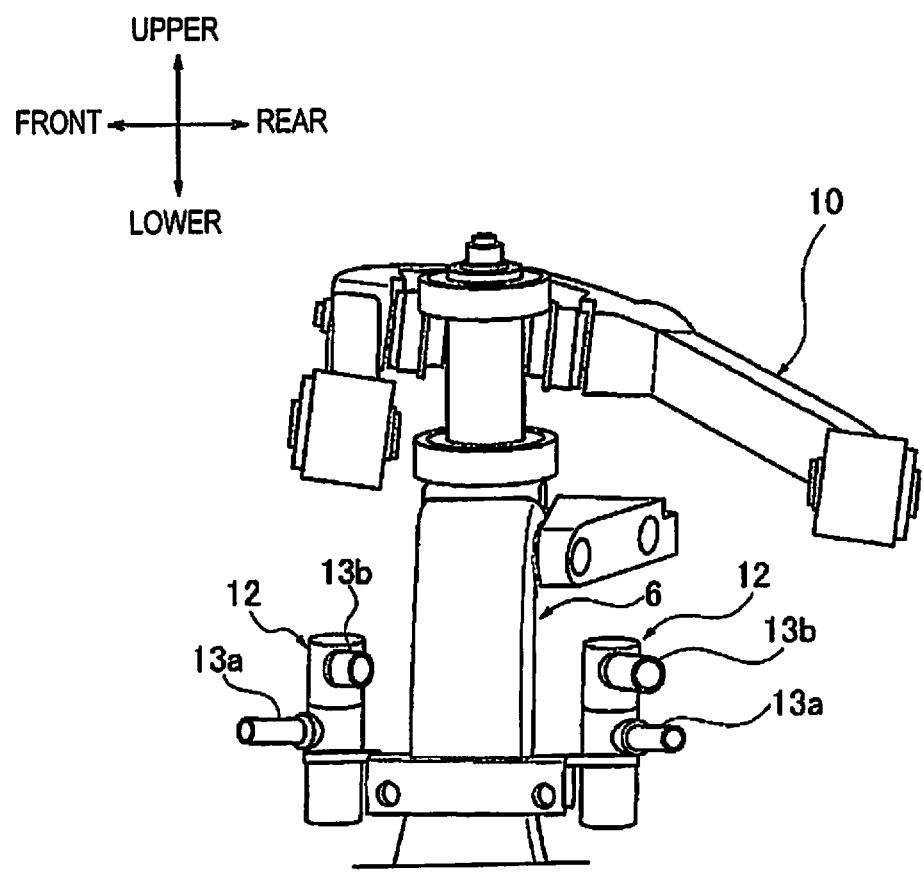
FIG. 18 is a perspective view of a knuckle arrangement structure of the rotary power source terminal which is made compact in the eighth embodiment.

FIG. 18 shows a knuckle arrangement structure of the rotary power source terminal. Below, with reference to FIGS. 17, 18, a description is given of the eighth embodiment.

As shown in FIG. 17, the rotary power source terminal 12 to be mounted on the knuckle 6 is formed such that the rotating contact portion 12e and the rotating screw portion 12d are shaped with a small shaft of rotating shaft member. Further, the fixing portion 12f formed in a cylindrical fixing member, a resilient member 12h, and the fixing screw portion 12i are structured with a large diameter and fixed to the knuckle 6. Note that, as the resilient member 12h, a multiple contact such as a contact spring (multi contract) and the like may be used, which allows contacting with low contact resistance by multi-faceted contact. In addition, the outer periphery of the rotating shaft member is covered by a rotating portion side leakage covering member 12j having an insertion hole of the movable power feed wire 13b. Also, the outer periphery of the cylindrical fixing member is covered by a rotating portion leaking covering member 12k having an insertion hole of the stationary power feed wire 13a. As shown in FIG. 18, in a state of the rotary power source terminal 12 being mounted to the knuckle 6, the rotating portion 12b is disposed in a vehicle upper position, and the fixing portion 12a is disposed in the vehicle lower position.

Thus, by placing the rotating portion 12b of the rotary power source terminal 12 in a vehicle upper position, the connection point with the movable power feed wire 13b is elevated so as to reduce interference with the in-wheel motor 5. In addition, since the fixed portion 12a is so configured to be placed in the vehicle lower position, the outer periphery of the fixing portion 12a provides a support portion to be fixed via a bracket or the like. Thus, it is possible to increase the overall support rigidity of the rotary power source terminal 12.

Note that the other configurations and effects are the same as in the first embodiment. Thus, the description thereof will be omitted.

Now, a description is given of the effect. In the motor power feed wire routing structure for the in-wheel motor driven wheel in the eighth embodiment, in addition to the effects of (7) of the seventh embodiment, it is possible to obtain the following effect.

(8) The rotary power source terminal 12 is configured such that the outer periphery of the rotating shaft member is covered by a rotating portion side leakage covering member 12j having an insertion hole for the vehicle body-side feed wire (movable power feed wire 13b), and the outer periphery of the cylindrical fixing portion is covered by a rotating portion side leakage covering member 12k having an insertion hole for the motor side feed wire (stationary power feed wire 13a) (FIG. 17).

Thus, it is possible to prevent leakage of electricity to the surrounding of the compacted rotary power source terminal 12.

The motor power feed wire routing structure for an in-wheel motor driven wheel according to the present invention has been described above based on the first to eighth embodiments. However, the specific structure is not limited to these embodiments. Rather, without departing from the gist of the invention according to each claim, design changes and additions are acceptable.

In the first to eighth embodiments, as the electrical connection mechanism, an example of a rotary power source terminal 12 is shown in which a fixing portion 12a for connecting a stationary power feed wire 13a extending from the in-wheel motor 5 and a movable power feed wire 12b for connecting a movable power feed wire 13b extending from the vehicle mounted power source. However, as long as the electrical connection mechanism functions to electrically connect the movable power feed wire to the stationary power feed wire, with both wires being held relatively rotatably to each other. other mechanism than the rotary power source terminal may be used.

In the first to eights embodiments, an example is shown in which the motor power feed wire routing structure for an in-wheel motor driven wheel according to the present invention is applied to a vehicle front wheel with a front suspension of an in-wheel motor vehicle. However, the motor power feed wire routing structure for an in-wheel motor driven wheel according to the present invention is also applicable to a rear wheel and the like when the wheel is subject to be driven and steered.

The invention claimed is:

1. A motor power feed wire routing structure for an in-wheel motor driven wheel having
a knuckle configured to be steered about a virtual kingpin axis, the upper side of virtual kingpin axis being inclined toward an inner side of a vehicle body with respect to a vehicle width direction;
the wheel connected to an axle rotatably supported by the knuckle, and a motor configured to provide a driving force to the axle; and the motor power feed wire routing structure comprising:
an electrical connection mechanism electrically connecting a motor side power feed wire extending from the motor and a vehicle body-side power feed wire extending from a vehicle mounted power source such that the vehicle body-side power feed wire is rotatably connected relative to the motor side power feed wire,
the electrical connection mechanism being disposed on the knuckle outside of a space of a wheel recess of the wheel.

2. The motor power feed wire routing structure for an in-wheel motor driven wheel as claimed in claim 1, wherein
a width of the knuckle is smaller than a diameter of the motor when viewed in an axial direction of the motor, the electrical connection mechanism includes a fixing portion to which the motor side power feed wire is connected and a rotating portion to which the vehicle body-side power feed wire is connected, and the fixing portion is arranged on a lower side of a vehicle vertical direction while the rotating portion is arranged on an upper side of the vehicle vertical direction.

3. The motor power feed wire routing structure for an in-wheel motor driven wheel as claimed in claim 1, wherein
the electrical connection mechanism is composed of a plurality of units, the plurality of the units of the electrical connection mechanism being arranged around the knuckle so as to be located at substantially a same radius about the virtual kingpin axis.

4. The motor power feed wire routing structure for an in-wheel motor driven wheel as claimed in claim 1, wherein
the electrical connection mechanism is composed of a plurality of units, the plurality of units being arranged so as to be close to the virtual kingpin axis around the knuckle, and to be arranged with a step in different height positions in a vehicle vertical direction.

5. The motor power feed wire routing structure for an in-wheel motor driven wheel as claimed in claim 1, wherein
the electrical connection mechanism is disposed in a multi-pole rotary power source terminal structure so that the single multiple wire integral rotary power source terminal is configured to connect a plurality of feed wires by a single piece multiple-wire integral rotary power source terminal.

6. The motor power feed wire routing structure for an in-wheel motor driven wheel as claimed in claim 1, wherein
a stationary power feed wire is formed in a stationary power feed wire integral bracket of a conductive reinforcing bracket structure which is fixed to the motor, the electrical connection mechanism, and the knuckle.

7. The motor power feed wire routing structure for an in-wheel motor driven wheel as claimed in claim 1, wherein
the electrical connection mechanism is formed in a rotary power source terminal which is configured such that a resilient member is interposed in a gap formed between an outer periphery of a rotating shaft member and an inner periphery of a cylindrical fixing member.

8. The motor power feed wire routing structure for an in-wheel motor driven wheel as claimed in claim 7, wherein
the rotary power source terminal is configured such that the outer periphery of the rotating shaft member is covered by a rotating portion side leakage covering member having an insertion hole for the vehicle body-side power feed wire, and the outer periphery of the cylindrical fixing portion is covered by a rotating portion side leakage covering member having an insertion hole for the motor side power feed wire.

9. The motor power feed wire routing structure for an in-wheel motor driven wheel as claimed in claim 2, wherein
the electrical connection mechanism is composed of a plurality of units, the plurality of the units of the electrical connection mechanism being arranged around the knuckle so as to be located at substantially the same radius about the virtual kingpin axis.

10. The motor power feed wire routing structure for an in-wheel motor driven wheel as claimed in claim 2, wherein
the electrical connection mechanism is composed of a plurality of units, the plurality of units being arranged so as to be close to the virtual kingpin axis around the knuckle, and to be arranged with a step in different height positions in a vehicle vertical direction.

11. The motor power feed wire routing structure for an in-wheel motor driven wheel as claimed in claim 3, wherein
the electrical connection mechanism is composed of a plurality of units, the plurality of units being arranged so as to be close to the virtual kingpin axis around the knuckle, and to be arranged with a step in different height positions in a vehicle vertical direction.

12. The motor power feed wire routing structure for an in-wheel motor driven wheel as claimed in claim 2, wherein
the electrical connection mechanism is disposed in a multi-pole rotary power source terminal structure so that a single multiple wire integral rotary power source terminal is configured to connect a plurality of feed wires by a single piece multiple-wire integral rotary power source terminal.

13. The motor power feed wire routing structure for an in-wheel motor driven wheel as claimed in claim 3, wherein
the electrical connection mechanism is disposed in a multi-pole rotary power source terminal structure so that a single multiple wire integral rotary power source terminal is configured to connect a plurality of feed wires by a single piece multiple-wire integral rotary power source terminal.

14. The motor power feed wire routing structure for an in-wheel motor driven wheel as claimed in claim 2, wherein
a stationary power feed wire is formed in a stationary power feed wire integral bracket of a conductive reinforcing bracket structure which is fixed to the motor, the electrical connection mechanism, and the knuckle.

15. The motor power feed wire routing structure for an in-wheel motor driven wheel as claimed in claim 3, wherein a stationary power feed wire is formed in a stationary power feed wire integral bracket of a conductive reinforcing bracket structure which is fixed to the motor, the electrical connection mechanism, and the knuckle.

16. The motor power feed wire routing structure for an in-wheel motor driven wheel as claimed in claim 4, wherein a stationary power feed wire is formed in a stationary power feed wire integral bracket of a conductive reinforcing bracket structure which is fixed to the motor, the electrical connection mechanism, and the knuckle.

17. The motor power feed wire routing structure for an in-wheel motor driven wheel as claimed in claim 5, wherein a stationary power feed wire is formed in a stationary power feed wire integral bracket of a conductive reinforcing bracket structure which is fixed to the motor, the electrical connection mechanism, and the knuckle.

18. The motor power feed wire routing structure for an in-wheel motor driven wheel as claimed in claim 2, wherein the electrical connection mechanism is formed in a rotary power source terminal which is configured such that a resilient member is interposed in a gap formed between an outer periphery of a rotating shaft member and an inner periphery of an cylindrical fixing member.

19. The motor power feed wire routing structure for an in-wheel motor driven wheel as claimed in claim 3, wherein the electrical connection mechanism is formed in a rotary power source terminal which is configured such that a resilient member is interposed in a gap formed between an outer periphery of a rotating shaft member and an inner periphery of an cylindrical fixing member.

20. The motor power feed wire routing structure for an in-wheel motor driven wheel as claimed in claim 4, wherein the electrical connection mechanism is formed in a rotary power source terminal which is configured such that a resilient member is interposed in a gap formed between an outer periphery of a rotating shaft member and an inner periphery of an cylindrical fixing member.

* * * * *